(12) United States Patent
Roush

(10) Patent No.: US 9,719,425 B2
(45) Date of Patent: Aug. 1, 2017

(54) COOLING SUPPLY CIRCUIT FOR TURBOMACHINERY

(71) Applicant: General Electric Company, Schenectady, NY (US)

(72) Inventor: Eric David Roush, Greer, SC (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 14/285,742

(22) Filed: May 23, 2014

(65) Prior Publication Data

US 2015/0337733 A1 Nov. 26, 2015

(51) Int. Cl.
*F02C 7/18* (2006.01)
*F01D 5/18* (2006.01)
*F01D 5/06* (2006.01)
*F01D 5/08* (2006.01)

(52) U.S. Cl.
CPC .............. *F02C 7/18* (2013.01); *F01D 5/066* (2013.01); *F01D 5/082* (2013.01); *F01D 5/084* (2013.01); *F01D 5/18* (2013.01)

(58) Field of Classification Search
CPC ..................................... F01D 5/18; F02C 7/18
USPC ................................. 415/115, 148; 416/96 R
See application file for complete search history.

(56) References Cited

U.S. PATENT DOCUMENTS

| | | | | |
|---|---|---|---|---|
| 2,339,779 | A * | 1/1944 | Holzwarth | F01D 5/085 416/96 R |
| 5,593,274 | A * | 1/1997 | Carreno | F01D 5/081 285/300 |
| 6,382,903 | B1 * | 5/2002 | Caruso | F01D 5/081 415/1 |
| 6,397,604 | B2 | 6/2002 | Eldrid et al. | |
| 6,540,477 | B2 | 4/2003 | Glynn et al. | |
| 7,993,102 | B2 | 8/2011 | Desai et al. | |
| 2009/0297339 | A1 * | 12/2009 | Schott | F01D 9/02 415/148 |
| 2010/0178168 | A1 | 7/2010 | Desai et al. | |

* cited by examiner

*Primary Examiner* — Mark Laurenzi
*Assistant Examiner* — Paul Thiede
(74) *Attorney, Agent, or Firm* — Ernest G. Cusick; Hoffman Warnick LLC

(57) ABSTRACT

Embodiments of the present disclosure include a cooling supply circuit within a turbine wheel, which may include: a substantially axial passage configured to communicate air along an axial length of the turbine wheel; a substantially radial inlet positioned within the turbine wheel between a hollow interior of the turbine wheel and the substantially axial passage, the inlet being configured to direct a rotor purge air into the substantially axial passage; and a substantially radial outlet positioned within the turbine wheel between the substantially axial passage and a cooled component coupled to a radial exterior of the turbine wheel, the outlet being configured to direct the rotor purge air towards the cooled component, wherein the outlet is axially displaced from the inlet.

14 Claims, 5 Drawing Sheets

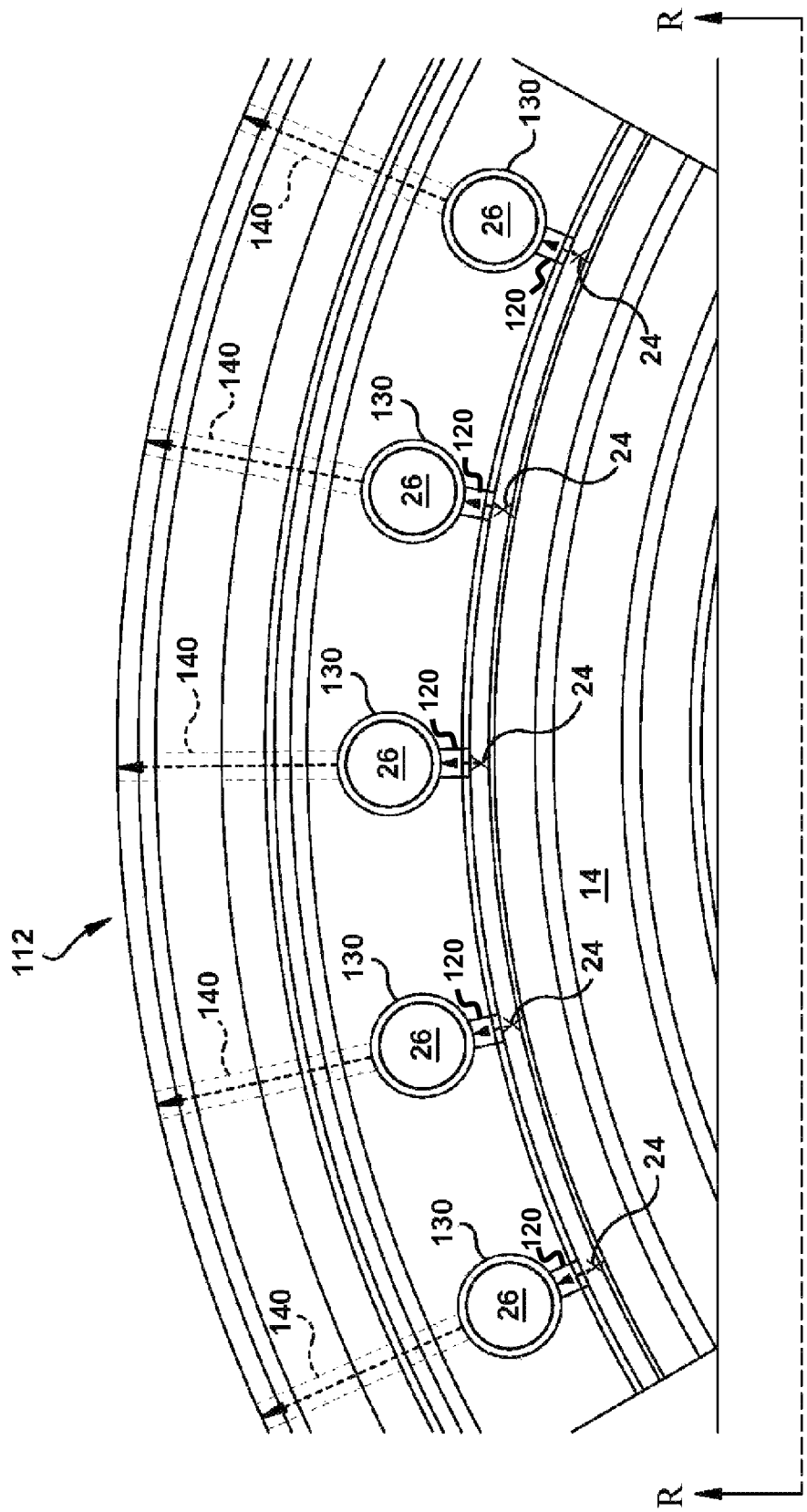

US 9,719,425 B2

COOLING SUPPLY CIRCUIT FOR TURBOMACHINERY

BACKGROUND OF THE INVENTION

Embodiments of the present disclosure relate generally to the cooling of turbomachinery. More specifically, the present disclosure relates to a cooling supply circuit, including related turbine wheels and gas turbine systems.

FIG. 1 shows a schematic view of a conventional gas turbine assembly T. A gas turbine is a type of internal combustion engine in which compressed air is reacted with a fuel source to generate a stream of hot air. The hot air enters a turbine section and flows against several turbine blades to impart work against a rotatable shaft. The shaft can rotate in response to the stream of hot air, thereby creating mechanical energy for powering one or more loads (e.g., compressors and/or generators) coupled to the shaft. Combustors T1, connected to fuel nozzles T2, are typically located between compressor T3 and turbine T4 sections of gas turbine assembly T. Fuel nozzles T2 can introduce fuel into combustor T1 which reacts with compressed air yielded from compressor T3. Air T5 flows sequentially through compressor T3, combustor T1, and lastly through turbine T4. Work imparted to rotatable shaft T6 can, in part, drive compressor T3. Other forms of turbomachinery besides gas turbines (e.g., gas turbine assembly T) may feature a similar arrangement of components.

Turbine T4 typically includes a rotatable shaft T6 and various turbine wheels mounted circumferentially thereon. In the example of a gas turbine system, these components may experience high temperatures during operation. In some cases, these temperatures may cause certain components of gas turbine assembly T to wear out over time. The effects of high temperature in a gas turbine can be offset with a positive purge system. A positive purge system can include a source of cooling air, sometimes yielded from the compressor, which is fed axially into turbine T4. The cooling air in a positive purge system can be directed throughout turbine T4 to cool various components of a turbomachine.

In FIG. 2, a cross section of a conventional turbomachine 10 and turbine wheel 12 is shown. Turbine wheel 12 may be positioned circumferentially about a rotor 14 and can have a substantially annular shape. Turbine wheel 12 and rotor 14 are shown in FIG. 2 as being substantially oriented along an axial axis A with a radial axis R extending therefrom. Several turbine buckets 16 can be radially coupled to turbine wheel 12 and extend substantially in the same direction as radial axis R. Turbine wheelspaces 18 can be positioned between each turbine bucket 16 and turbine wheel 12. Turbine buckets 16 may increase in temperature while rotor 14 and turbine wheel 12 rotate during operation.

Several channels 20 may extend radially from rotor 14 through a body 22 of turbine wheel 12. A portion of rotor purge air 24 travelling along rotor 14 can enter channels 20 to pass through body 22 toward turbine buckets 16 and turbine wheelspaces 18. Body 22 can be coupled to wheel 12 by any currently known or later developed form of mechanical coupling, such as a fastener, a lock, a coupling mechanism, etc., with an example shown in FIG. 2 as a bolt circle 26. Bolt circle 26 can extend in a particular direction (e.g., parallel to axial axis A) through turbine wheel 12 and body 22 to prevent body 22 from being radially displaced during operation. Each channel 20 can provide fluid communication between a hollow interior 28 and a radial exterior 30 of turbine wheel 12, and may travel around or past bolt circle 26. Rotor 14 can be positioned within hollow interior 28 of turbine wheel 12, while turbine buckets 16 and turbine wheelspaces 18 can be coupled to radial exterior 30.

BRIEF DESCRIPTION OF THE INVENTION

A first aspect of the present disclosure provides a cooling supply circuit within a turbine wheel. The cooling supply circuit can include: a substantially axial passage configured to communicate air along an axial length of the turbine wheel; a substantially radial inlet positioned within the turbine wheel between a hollow interior of the turbine wheel and the substantially axial passage, the inlet being configured to direct a rotor purge air into the substantially axial passage; and a substantially radial outlet positioned within the turbine wheel between the substantially axial passage and a cooled component coupled to a radial exterior of the turbine wheel, the outlet being configured to direct the rotor purge air towards the cooled component, wherein the outlet is axially displaced from the inlet.

A second aspect of the present disclosure provides a turbine wheel. The turbine wheel can include: a body having a substantially hollow interior and a radial exterior; a substantially radial inlet positioned within the body between the hollow interior of the body and a substantially axial passage therein, the inlet being configured to direct a rotor purge air into the substantially axial passage; and a substantially radial outlet positioned within the body between the substantially axial passage and a cooled component coupled to the radial exterior of the body, the outlet being configured to direct the rotor purge air towards the cooled component, wherein the outlet is axially displaced from the inlet.

A third aspect of the present disclosure provides a gas turbine system. The gas turbine system can include: a combustor; a compressor in fluid communication with the combustor; a plurality of fuel nozzles in fluid communication with the combustor; and a turbine section in fluid communication with the combustor, wherein the turbine section further includes a rotor; a turbine wheel positioned circumferentially about the rotor and configured to hold a plurality of buckets thereon; a substantially axial passage positioned within the turbine wheel, the substantially axial passage being configured to communicate air along an axial length of the turbine wheel; a substantially radial inlet positioned within the turbine wheel between the rotor and the substantially axial passage, the inlet being configured to direct a rotor purge air into the substantially axial passage; and a substantially radial outlet positioned within the turbine wheel between the substantially axial passage and a cooled component coupled to the turbine wheel, the outlet being configured to direct the rotor purge air towards the cooled component, wherein the outlet is axially displaced from the inlet.

BRIEF DESCRIPTION OF THE DRAWING

These and other features of the disclosed apparatus will be more readily understood from the following detailed description of the various aspects of the apparatus taken in conjunction with the accompanying drawings that depict various embodiments of the invention, in which:

FIGS. 4 and 5 are partial cross sectional front views of a turbine wheel and cooling supply circuit according to embodiments of the present disclosure.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION OF THE INVENTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely exemplary.

Figure 2:
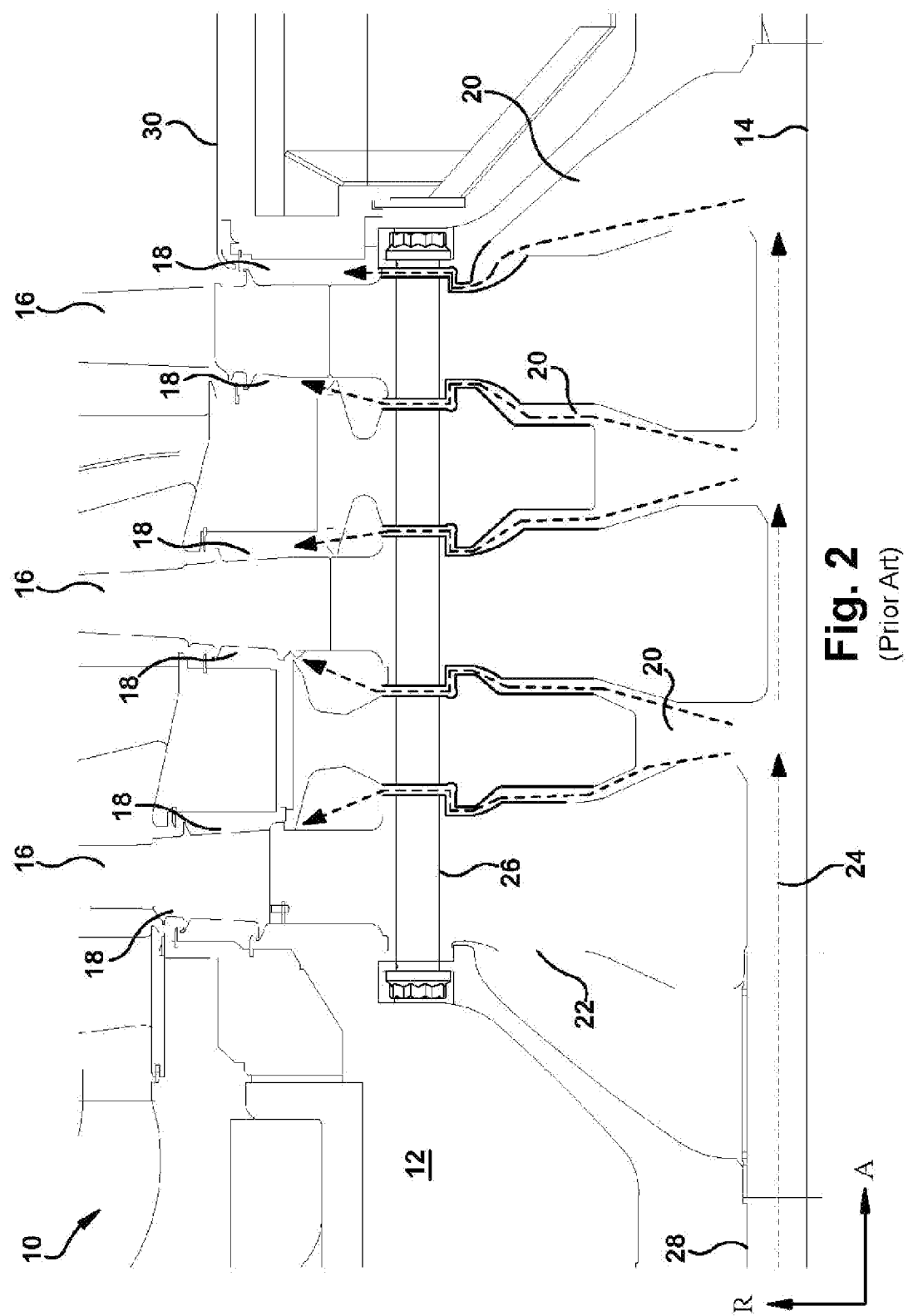
FIG. 2 is a cross sectional side view of a conventional turbine wheel and rotor purge air arrangement.

Referring to turbomachine 10 of FIG. 2, it has been discovered that cooling channels 20 being evenly spaced and substantially uniform in size can cause turbine buckets 16 and turbine wheelspaces 18 to have uneven temperature distributions during operation. Specifically, some turbine buckets 16 and turbine wheelspaces 18 may require additional cooling from other sources in this arrangement. However, other turbine buckets 16 and turbine wheelspaces 18 in the same turbomachine 10 may receive more rotor purge air 24 than is needed for effective cooling.

Figure 3:
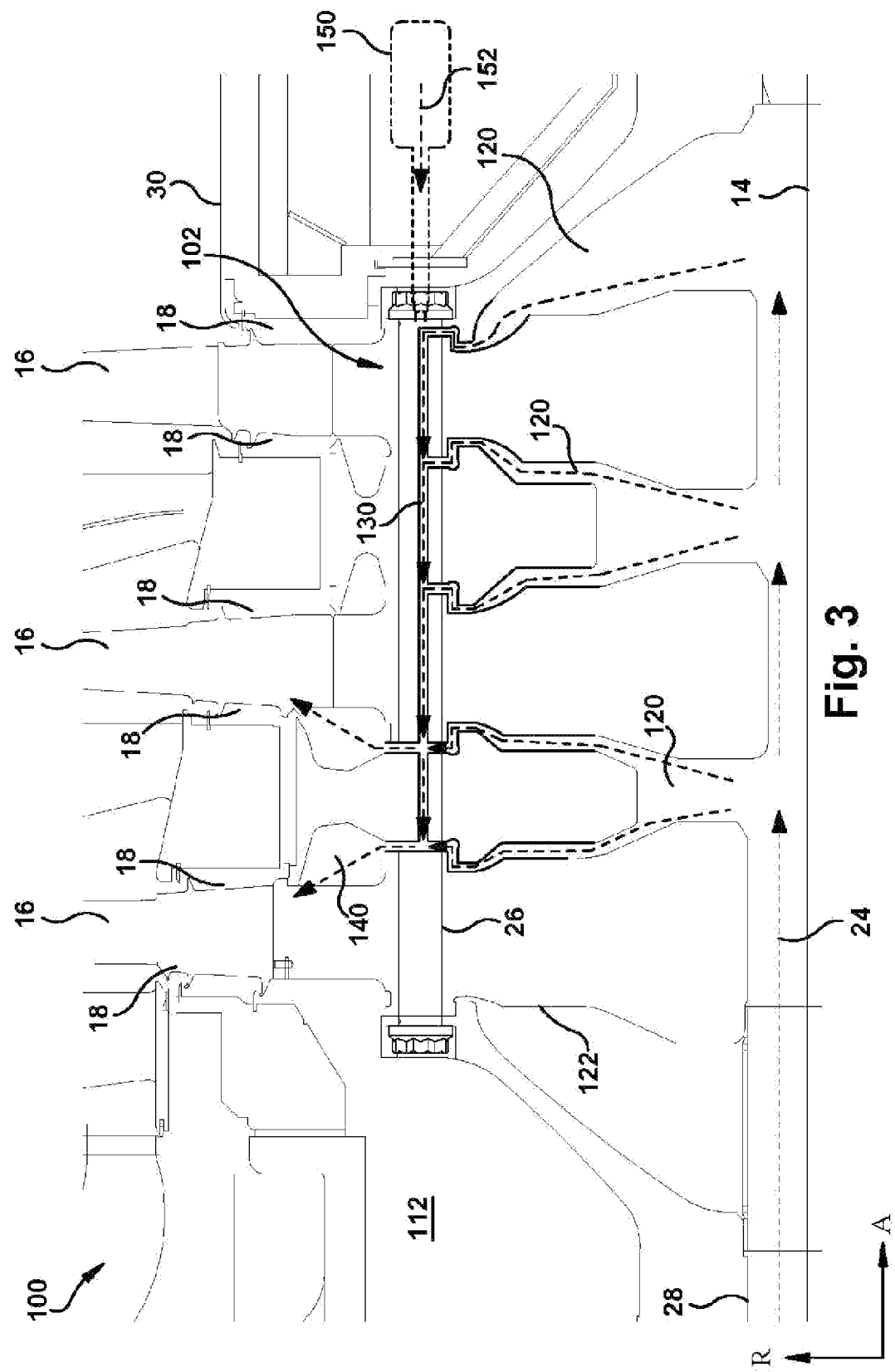
FIG. 3 is a cross sectional side view of a turbine wheel and cooling supply circuit according to an embodiment of the present disclosure.

Turning to FIG. 3, a cross section of a turbomachine 100 including a cooling supply circuit 102 and turbine wheel 112 according to an embodiment of the present disclosure is shown. Cooling supply circuit 102 can include several substantially radial inlets ("inlets") 120 positioned within turbine wheel 112. Each inlet 120 can traverse a body 122 of turbine wheel 112 between its substantially hollow interior 28 (which can include rotor 14 therein) and a substantially axial passage 130 positioned within turbine wheel 112. Inlets 120 can communicate rotor purge air 24 from rotor 12 into substantially axial passage 130.

Substantially axial passage 130 can be positioned within turbine wheel 112 and may be in a substantially parallel alignment with axial direction A. In a particular embodiment, substantially axial passage 130 can be positioned alongside bolt circle 26. In other embodiments (e.g., as shown in FIG. 5 and discussed herein), bolt circle 26 can be positioned within substantially axial passage 130. Substantially axial passage 130 can collect rotor purge air 24 from several inlets 120 to axially divert rotor purge air 24 from a group of inlets 120 towards one or more axially displaced outlets ("outlets") 140. The axial displacement between at least one inlet 120 and at least one outlet 140 through substantially axial passage 130 can divert rotor purge air 24 towards components of turbomachine 100 where cooling has a greater effect.

Outlet 140 can provide fluid communication between substantially axial passage 130 and one or more components for cooling (referred to herein as "cooled component(s)") such as turbine buckets 16 and turbine wheelspaces 18. The cooled component may be coupled to turbine wheel 112 at any desired location accessible through outlet 140, and in a particular embodiment can be coupled to radial exterior 30. Where turbine bucket 16 is being cooled according to embodiments of the present disclosure, turbine bucket 16 can be coupled to turbine wheel 112 by any currently known or later developed type of mechanical coupling, such as a lock, bolt, engageable surface, etc. Where turbine wheelspace 18 is being cooled, turbine wheelspace 18 can be a surface within or upon radial exterior 30 and positioned within the flow path of rotor purge air 24 through cooling circuit 102. In any case, a cooled component (e.g., turbine wheel 16 and/or turbine wheelspace 18) can be axially displaced from at least one inlet 120 for collecting rotor purge air 24 used for cooling. In some cases, one inlet 120 can be radially aligned with (i.e., not axially displaced from) one outlet 140, but also in communication with one or more other inlets 120 axially displaced from outlet 140 via substantially axial passage 130. During operation, cooling circuit 102 can provide additional rotor purge air 24 to a first cooled component (e.g., turbine bucket 16 or turbine wheelspace 18) with a higher temperature than another cooled component (e.g., an axially displaced turbine bucket 16 or axially displaced turbine wheelspace 18) coupled to turbine wheel 112.

Cooling circuit 102 can be coupled to additional sources of cooling air, if desired. A bucket supply air source 150 can be coupled to substantially axial passage 130 to provide bucket supply air 152, an additional type of cooling air. Bucket supply air 152 can include any type of repurposed or dedicated air supply for cooling turbine buckets 16 and/or any related components that is not yielded from the same source as rotor purge air 24 (e.g., compressor T3 (FIG. 1)). Bucket supply air 152 can be intermixed with rotor purge air 24 within substantially axial passage 130 before traveling through outlet 140 to reach a cooled component. Bucket supply air source 150 can additionally or alternatively be coupled to other areas of turbine wheel 112. For instance, bucket supply air source 150 can provide bucket supply air 152 to inlets 120, outlets 140, and/or other cavities for transmitting a cooling fluid.

Other embodiments of cooling circuit 102 can concentrate cooling fluids such as rotor purge air 24 and/or bucket supply air 152 at particular cooled components without increasing the total amount of cooling fluid (also known as chargeable flow) supplied to the system. A single outlet 140 can collect rotor purge air 24 yielded to substantially axial passage 130 from several inlets 120. In the example shown in FIG. 3, two outlets 140 collect rotor purge air 24 delivered to substantially axial passage 130 from five different inlets 120 to increase the concentration of cooling fluid to the cooled components of turbomachine 100. It is understood that the example embodiments of FIG. 3 can be modified to suit various cooling needs. Some embodiments can include one outlet 140 in fluid communication with dozens, hundreds, thousands, etc., of inlets 120. Any conceivable number of inlets 120 can provide rotor purge air 24 to any conceivable number of outlets 140 by axially communicating rotor purge air 24 along substantially axial passage 130. The axial flow of rotor purge air 24 and/or bucket supply air 152 directs a greater concentration of cooling fluids to cooled components (e.g., turbine buckets 16 and/or turbine wheelspaces 18) with higher temperatures. If desired, the axial flow along substantially axial passage 130 can be further increased by sealing some outlets 140 of an existing turbine wheel 112. One or more existing outlets 140 can be sealed by any currently known or later developed sealing process, e.g., welding, inserting stoppers, closing valves, etc.

Figure 4:
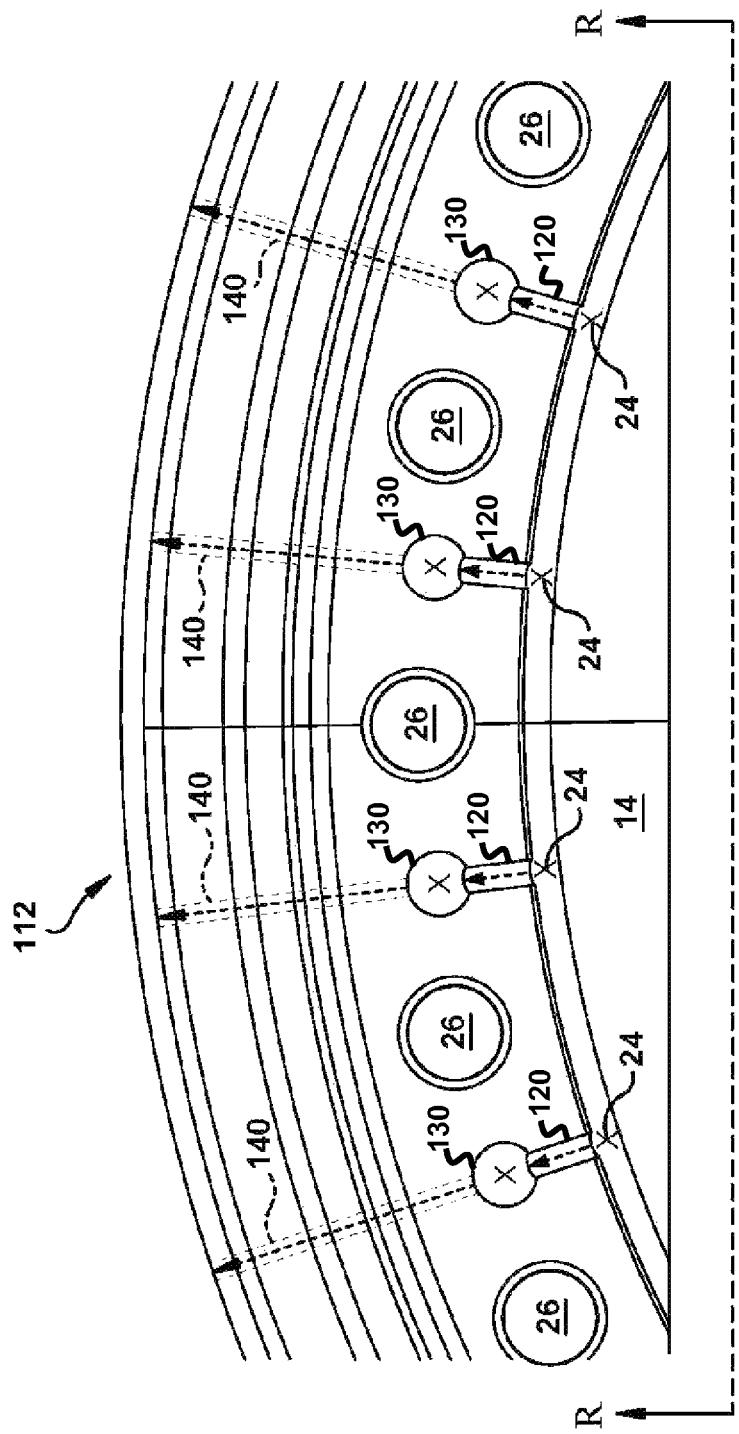

Turning to FIG. 4, features of the present disclosure can be applied to other types of devices as an addition or alternative to cooling circuit 102. For example, the present disclosure can be embodied in the form of one or more turbine wheels 112 manufactured, machined, processed, etc., to include outlets 140 in communication with axially displaced inlets 120. FIG. 5 depicts a partial cross section along line R-R of a turbine wheel 112 according to embodiments of the present disclosure. Inlets 120 and outlets 140 of turbine wheel 112 can be connected via substantially axial passage 130 therebetween. Axial passages 130 can be located in between different bolt circles 26. Rotor purge air 24 can enter turbine wheel 112 through inlet 120, which may be at a particular location along rotor 14. Rotor purge air 14 is shown to have traveled into the plane of the page by the flow path vector marked with an "X" between rotor 14 and turbine wheel 112. Rotor purge air 24, upon reaching substantially axial passage 130, can travel further into the plane of the page along the flow path vector marked in substantially axial passage 130 with an "X." Rotor purge air 24 can flow through substantially axial passage 130 to reach outlet 140 (shown in phantom) at a different axial location. Rotor purge air 24 can then pass through outlet 140 to reach a cooled component (e.g., turbine bucket 16 (FIG. 3) or turbine wheelspace 18 (FIG. 3)).

Turning to FIG. 5, an alternative embodiment of turbine wheel 112 is shown. Again, a partial cross section of turbine wheel 112 along line R-R is shown. In the alternative embodiment, bolt circle 26 can be housed within substantially axial passage 130, such that bolt circle 26 is fastened to and/or projecting from an axial wall or endpoint of substantially axial passage 130. Rotor purge air 24 entering substantially axial passage 130 can flow axially alongside bolt circle 26 while traversing turbine wheel 112. Thus, existing bolt circles 26 can be used in embodiments of turbine wheel 112 by sizing substantially axial passage 130 to incorporate bolt circle 26 and axial flow of rotor purge air 24.

Figure 1:
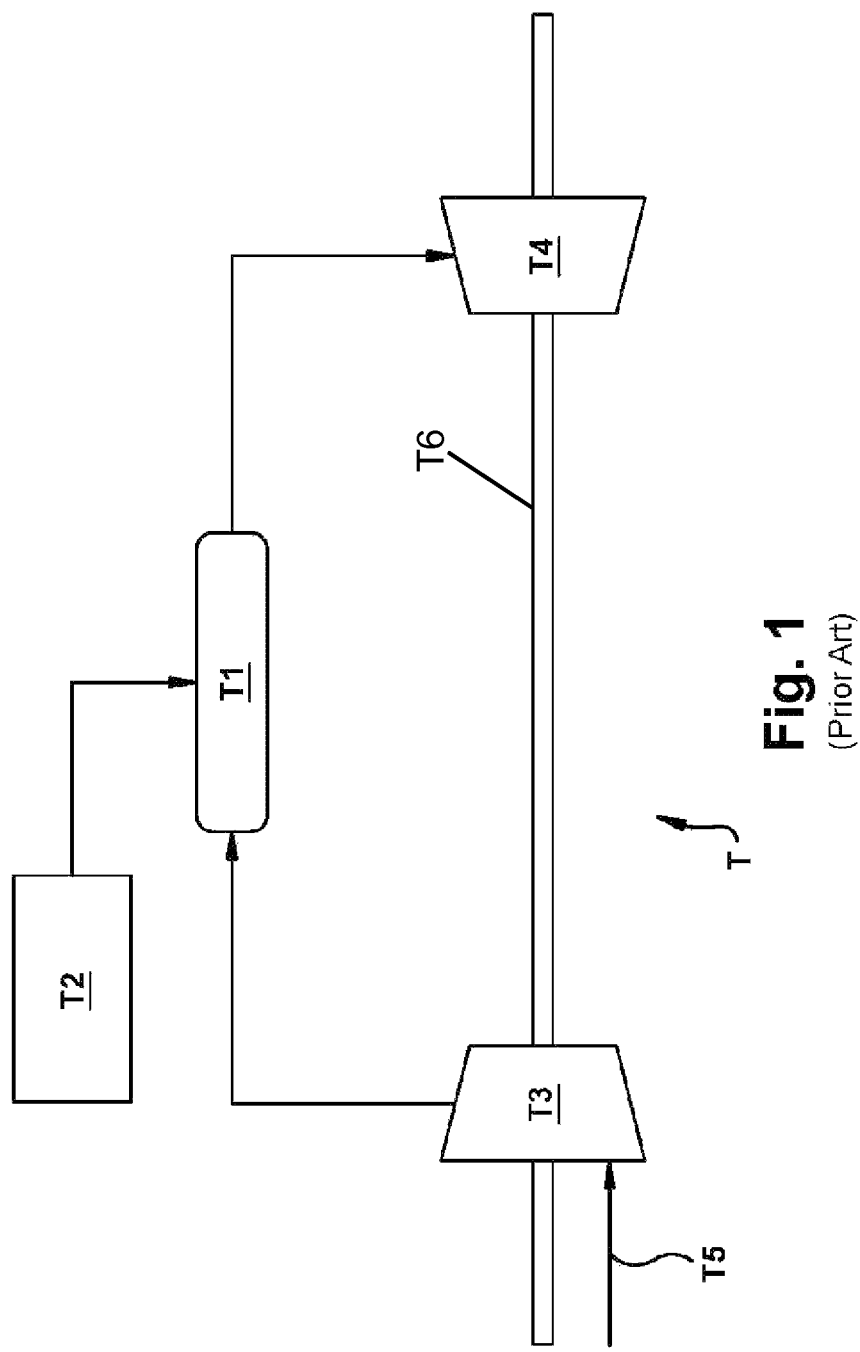
FIG. 1 is a schematic view of a conventional gas turbine assembly.

Turbine wheel 112 may be specially manufactured to include inlets 120, outlets 140, and/or axial passage 130. In addition or alternatively, inlets 120, outlets 140, and/or axial passage 130 can be added to an existing turbine wheel 112 by any currently known or later developed tools or processes for modifying particular equipment (drilling tools, cutting tools, metallurgy, chemical processes, etc.) or combinations thereof. Cooling circuit 102 (FIG. 3), turbine wheel 112, and/or turbomachine 100 (FIG. 3) can be installed entirely within a single turbine section of turbomachine 100 (FIG. 3). Cooling circuit 102 (FIG. 3) and/or turbine wheel 112 can therefore be in the form of an independent and self-contained component with respect to other sections such as including compressor T3 (FIG. 1), combustor T1 (FIG. 1), fuel nozzles T2 (FIG. 1), etc. More specifically, turbine wheel 112 can be a single section or stage within a larger turbine T4 (FIG. 1) composed of multiple stages, sections, etc., which may be divided according to the size of different turbine buckets 18 (FIG. 1).

Embodiments of the present disclosure can be provided in other forms. Turbomachine 100 (FIG. 3), for example, can include a gas turbine system, steam turbine system, wind turbine system, and/or any other type of turbine assembly currently known or later developed which is adapted to include cooling circuit 102 (FIG. 3) and/or turbine wheel 112 (FIG. 3). A turbomachine system according to the present disclosure can include a gas turbine system (e.g., gas turbine T (FIG. 1)) composed substantially of combustor T1 (FIG. 1), compressor T3 (FIG. 1) in fluid communication with combustor T1 (FIG. 1), and a plurality of fuel nozzles T2 (FIG. 1) in fluid communication with combustor T1 (FIG. 1). One or more turbine sections T4 (FIG. 1) can be in fluid communication with combustor T1 (FIG. 1) and include rotor 14 (FIG. 3) with cooling circuit 102 (FIG. 3) and/or turbine wheel 112 (FIG. 3) according to embodiments of the disclosure discussed herein. Gas turbine T (FIG. 1) can also include one section or stage of turbine T4 (FIG. 1) which entirely contains turbine wheel 112 (FIG. 3) with inlets 120 (FIG. 3), substantially axial passage 130 (FIG. 3), and/or outlets 140 (FIG. 3) without any one of these components crossing into other turbine stages or sections.

The features of the present disclosure discussed herein can provide several technical and commercial advantages, some of which are discussed as illustrative examples. By drawing off and reusing a portion of rotor purge air 24 (FIG. 3) to cool particular turbine buckets 16 (FIG. 3) and turbine wheelspaces 18 (FIG. 3), the amount of cooling air drawn from other sources is decreased. More specifically, using rotor purge air 24 (FIG. 3) to cool turbine components as disclosed herein can reduce the total amount of cooling air (also known as chargeable flow) supplied to turbomachine 10 (FIG. 3). Decreasing the draw of air supply from other reserves (e.g., bucket supply air source 150 (FIG. 3)) can increase the performance of turbomachinery such as gas turbine assemblies T (FIG. 1) during transient operation when components thereof are subject to higher temperatures. Embodiments of the present disclosure can also cool components of turbomachinery (e.g., turbine buckets 16 (FIG. 3) and turbine wheelspaces 18 (FIG. 3)) by using rotor purge air 24 (FIG. 3) alone or in combination with bucket supply air 152 (FIG. 3).

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A turbine wheel comprising:
   a body having a substantially hollow interior and a radial exterior;
   a first substantially axial passage positioned within the turbine wheel adjacent to the rotor, the first substantially axial passage communicating rotor purge air along its length;
   a second substantially axial passage positioned within the turbine wheel between the first substantially axial passage and the radial exterior so as to be radially spaced apart from the first substantially axial passage, the second substantially axial passage having at least one outlet in communication with at least one cooled component of the turbine wheel;

a plurality of substantially radial passages positioned between the first substantially axial passage and the second substantially axial passage, each substantially radial passage of the plurality of substantially radial passages possessing an inlet in fluid communication with the first substantially axial passage and an outlet in fluid communication with the second substantially axial passage, wherein the communicated rotor purge air flows from the first substantially axial passage through the respective inlets of the plurality of substantially radial passages and out the respective outlets of the plurality of substantially radial passages and into the second substantially axial passage so as to flow within at least a portion of the second substantially axial passage and flow out through the at least one outlet of the second substantially axial passage and cool the at least one cooled component of the turbine wheel; and a bucket supply air source in fluid communication with the second substantially axial passage, wherein the second substantially axial passage directs a combined stream of the bucket supply air from the bucket supply air source and the rotor purge air into the at least one outlet of the second substantially axial passage.

2. The turbine wheel of claim 1, wherein the cooled component comprises one of a turbine bucket and a turbine wheelspace.

3. The turbine wheel of claim 1, wherein the cooled component comprises a first turbine bucket of a plurality of buckets, and the at least one outlet of the second substantially axial passage is substantially radially aligned with a second turbine bucket of the plurality of buckets having a lower temperature than the first turbine bucket.

4. The turbine wheel of claim 1, further comprising a bolt circle positioned within the body, wherein the bolt circle is positioned substantially within the first substantially axial passage.

5. The turbine wheel of claim 1, wherein the body is configured to be positioned within a single turbine section of a turbomachine.

6. A turbine wheel comprising:
a body having a substantially hollow interior and a radial exterior;
a first substantially axial passage positioned within the turbine wheel adjacent to the rotor, the first substantially axial passage communicating rotor purge air along its length;
a second substantially axial passage positioned within the turbine wheel between the first substantially axial passage and the radial exterior so as to be radially spaced apart from the first substantially axial passage, the second substantially axial passage having at least one outlet in communication with at least one cooled component of the turbine wheel;
a plurality of substantially radial passages positioned between the first substantially axial passage and the second substantially axial passage, each substantially radial passage of the plurality of substantially radial passages possessing an inlet in fluid communication with the first substantially axial passage and an outlet in fluid communication with the second substantially axial passage, wherein the communicated rotor purge air flows from the first substantially axial passage through the respective inlets of the plurality of substantially radial passages and out the respective outlets of the plurality of substantially radial passages and into the second substantially axial passage so as to flow within at least a portion of the second substantially axial passage and flow out through the at least one outlet of the second substantially axial passage and cool the at least one cooled component of the turbine wheel; and a bolt circle positioned within the body, wherein the bolt circle is positioned substantially within the first substantially axial passage.

7. The turbine wheel of claim 6, further comprising a bucket supply air source in fluid communication with the second substantially axial passage, wherein the second substantially axial passage directs a combined stream of the bucket supply air from the bucket supply air source and the rotor purge air into the at least one outlet of the second substantially axial passage.

8. The gas turbine system of claim 6, wherein the cooled component comprises one of a turbine bucket and a turbine wheelspace.

9. The gas turbine system of claim 6, wherein the cooled component comprises a first turbine bucket of a plurality of buckets, and the at least one outlet of the second substantially axial passage is substantially radially aligned with a second turbine bucket of the plurality of buckets having a lower temperature than the first turbine bucket.

10. A cooling supply circuit for cooling a turbine wheel, the turbine wheel having a rotor, a hollow interior, and a radial exterior, the rotor being disposed within the hollow interior of the turbine wheel and the radial exterior of the turbine wheel being radially spaced apart from the hollow interior of the turbine wheel, the cooling supply circuit comprising:
a first substantially axial passage positioned within the turbine wheel adjacent to the rotor, the first substantially axial passage communicating rotor purge air along its length;
a second substantially axial passage positioned within the turbine wheel between the first substantially axial passage and the radial exterior so as to be radially spaced apart from the first substantially axial passage, the second substantially axial passage having at least one outlet in communication with at least one cooled component of the turbine wheel;
a bolt circle positioned within the first substantially axial passage; and
a plurality of substantially radial passages positioned between the first substantially axial passage and the second substantially axial passage, each substantially radial passage of the plurality of substantially radial passages possessing an inlet in fluid communication with the first substantially axial passage and an outlet in fluid communication with the second substantially axial passage, wherein the communicated rotor purge air flows from the first substantially axial passage through the respective inlets of the plurality of substantially radial passages and out the respective outlets of the plurality of substantially radial passages and into the second substantially axial passage so as to flow within at least a portion of the second substantially axial passage and flow out through the at least one outlet of the second substantially axial passage and cool the at least one cooled component of the turbine wheel.

11. The cooling supply circuit of claim 10, further comprising;
a bucket supply air source that supplies air that flows in the second substantially axial passage, wherein the supplied air of the supply air source and the rotor purge air are disposed in the second substantially axial passage to form a combined air supply, wherein the combined air supply flows out of the at least one outlet of the second substantially axial passage to cool the at least one cooled component of the turbine wheel.

12. The cooling supply circuit of claim 10, further comprising a bucket supply air source in fluid communication with the second substantially axial passage, wherein the second substantially axial passage directs a combined stream of the bucket supply air from the bucket supply air source and the rotor purge air into the at least one outlet of the second substantially axial passage.

13. The cooling supply circuit of claim 10, wherein the cooled component comprises one of a turbine bucket and a turbine wheelspace.

14. The cooling supply circuit of claim 10, wherein the cooled component comprises a first turbine bucket of a plurality of buckets, and the at least one outlet of the second substantially axial passage is substantially radially aligned with a second turbine bucket of the plurality of buckets having a lower temperature than the first turbine bucket.

* * * * *